US009221118B2

(12) United States Patent
Lin et al.

(10) Patent No.: US 9,221,118 B2
(45) Date of Patent: Dec. 29, 2015

(54) ADAPTIVE CONTROL HYBRID WELDING SYSTEM AND METHODS OF CONTROLLING

(75) Inventors: Dechao Lin, Greer, SC (US); Srikanth Chandrudu Kottilingam, Simpsonville, SC (US); Yan Cui, Greer, SC (US); David Schick, Greenville, SC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 729 days.

(21) Appl. No.: 13/558,997

(22) Filed: Jul. 26, 2012

(65) Prior Publication Data

US 2014/0027415 A1 Jan. 30, 2014

(51) Int. Cl.
| | |
|---|---|
| *B23K 26/00* | (2014.01) |
| *B23K 9/127* | (2006.01) |
| *B23K 9/173* | (2006.01) |
| *B23K 26/03* | (2006.01) |
| *B23K 26/04* | (2014.01) |
| *B23K 26/14* | (2014.01) |
| *B23K 26/26* | (2014.01) |
| *B23K 26/32* | (2014.01) |

(52) U.S. Cl.
CPC ............. *B23K 9/1274* (2013.01); *B23K 9/1276* (2013.01); *B23K 9/173* (2013.01); *B23K 26/032* (2013.01); *B23K 26/045* (2013.01); *B23K 26/048* (2013.01); *B23K 26/1429* (2013.01); *B23K 26/26* (2013.01); *B23K 26/3206* (2013.01); *B23K 26/3213* (2013.01); *B23K 2203/04* (2013.01); *B23K 2203/08* (2013.01)

(58) Field of Classification Search
CPC .... B23K 9/173; B23K 9/1274; B23K 9/1276; B23K 26/032; B23K 26/045; B23K 26/1429; B23K 26/26; B23K 26/3206; B23K 26/3213; B23K 26/048; B23K 2203/04; B23K 2203/08
USPC .............................. 219/121.6–121.64, 124.1, 219/124.22–124.34, 137.2, 137 R; 228/175
See application file for complete search history.

(56) References Cited

U.S. PATENT DOCUMENTS

| | | | |
|---|---|---|---|
| 7,107,118 B2 | 9/2006 | Orozco et al. | |
| 7,759,603 B2 | 7/2010 | Aigner et al. | |
| 2011/0155711 A1* | 6/2011 | Doyle et al. | ............... 219/137 R |
| 2011/0198317 A1 | 8/2011 | Lin | |
| 2011/0290765 A1* | 12/2011 | Albrecht et al. | ........... 219/78.01 |

FOREIGN PATENT DOCUMENTS

EP 2340908 A1 6/2011

OTHER PUBLICATIONS

Shi, G and Hilton P., "A comparison of the gap bridging capability of CO2 laser and hybrid CO2 laser MAG welding on 8mm thickness C-MN steel plate", TWI, http://www.twi.co.uk/content/spsgsjuly2005.html; pp. 1-12.

* cited by examiner

*Primary Examiner* — Dana Ross
*Assistant Examiner* — Lindsey C Teaters
(74) *Attorney, Agent, or Firm* — McNees Wallace & Nurick LLC

(57) ABSTRACT

An adaptive control hybrid welding system including hybrid welding apparatus, control system connected to hybrid welding apparatus, and seam tracker connected to control system is provided. Hybrid welding apparatus includes a laser and an electric arc welder. Laser and electric arc welder each have adjustable welding parameters. Control system modifies welding parameters of laser and electric arc welder, and spacing between laser beam and arc of welder. Seam tracker is operable to measure seam property of adjacent workpieces prior to welding. Seam tracker is operable to send signals to control system in response to the measured seam property. Control system modifies welding parameters based on signal from seam tracker and adaptive control hybrid welding apparatus joins adjacent workpieces having variable gap sizes of up to 2.5 mm with full penetration welds. Also provided is a method of controlling the adaptive control hybrid welding system.

16 Claims, 7 Drawing Sheets

ADAPTIVE CONTROL HYBRID WELDING SYSTEM AND METHODS OF CONTROLLING

FIELD OF THE INVENTION

This invention relates to joining technology generally and more specifically to an adaptive control hybrid welding system and methods of controlling adaptive control hybrid welding system when joining workpieces having variable gaps and mismatches.

BACKGROUND OF THE INVENTION

Gaps and mismatches present in joints between adjacent components or workpieces to be joined by welding present challenges impacting manual and automated welding processes. With manual welding, a welder can change the welding parameters intuitively resulting in a good weld. Automated welding does not have the flexibility of manual welding. To achieve good welds in automated welding adaptive control with assistance from a seam tracker is used. Adaptive control is oftentimes difficult and cumbersome to implement. Adaptive control adjusts welding parameter settings in real time during the welding process based on the joint gap inspection. The methods currently employed in automated welding include cumbersome programs and cameras.

Variable gaps of more than 1.5 millimeters in joints of adjacent workpieces are difficult to bridge using automated welding systems. Using adaptive control to slow down the welding speeds and increase the filler metal delivery rates does not provide adequate gap bridging. Trying to use conventional welding techniques to fill larger gaps results in unstable weld pools which can result in blow through holes, lack of penetration, underfill, or lack of fusion between the workpieces or components that are being joined.

It is challenging to guarantee weld quality of welds made in joints in adjacent workpieces having variable gaps using traditional adaptive control welding processes. Examples of challenges include undercut and underfill of welds or partial or incomplete penetration welds, all of which are unacceptable.

Therefore, an adaptive control hybrid welding system and methods of controlling the adaptive control hybrid welding system that do not suffer from the above drawbacks are desirable in the art.

SUMMARY OF THE INVENTION

According to an exemplary embodiment of the present disclosure, an adaptive control hybrid welding system is provided. The adaptive control hybrid welding system includes a hybrid welding apparatus, a control system connected to the hybrid welding apparatus, and a seam tracker connected to the control system. The hybrid welding apparatus includes a laser and an electric arc welder, the laser and the electric arc welder each having adjustable welding parameters. The control system modifies the welding parameters of the laser and the electric arc welder and a spacing between a laser beam of the laser and an arc of the electric arc welder. The seam tracker is operable to measure a seam property of adjacent workpieces prior to welding. The seam tracker operable to send signals to the control system in response to the measured seam property. The control system modifies welding parameters based on the signal from the seam tracker and the adaptive control hybrid welding system joins adjacent workpieces having variable gaps along the seam.

According to another exemplary embodiment of the present disclosure, a method of controlling an adaptive control hybrid welding system is provided. The method includes providing a hybrid welding system. The hybrid welding system includes a hybrid welding apparatus, a control system connected to the hybrid welding apparatus, and a seam tracker connected to the control system. The hybrid welding apparatus includes a laser and an electric arc welder, the laser and the electric arc welder each having adjustable welding parameters. The control system modifies the welding parameters of the laser, the electric arc welder, and a spacing between a laser beam of the laser and an arc of the electric arc welder. The seam tracker is operable to measure a seam property of adjacent workpieces along a seam prior to welding. The seam tracker is operable to send signals to the control system in response to the measured seam property. The control system modifies welding parameters based on the signal from the seam tracker. The adaptive control hybrid welding system joins adjacent workpieces having variable gaps along the seam, the variable gaps in the seam being up to approximately 2.5 millimeters wide. The method includes identifying the seam property between adjacent workpieces with the seam tracker. The method includes adjusting at least one weld parameter of the laser or the electric arc welder or the spacing between the laser beam and the arc with the control system in response to the identified seam property, wherein the seam property is the variable gap being greater than approximately 0.3 millimeters wide between the adjacent workpieces, wherein adjusting provides a full penetration weld along the seam.

Other features and advantages of the present disclosure will be apparent from the following more detailed description of the preferred embodiments, taken in conjunction with the accompanying drawings which illustrate, by way of example, the principles of the disclosure.

BRIEF DESCRIPTION OF THE DRAWINGS

Wherever possible, the same reference numbers will be used throughout the drawings to represent the same parts.

DETAILED DESCRIPTION OF THE INVENTION

Provided is an adaptive hybrid welding system methods of controlling that do not suffer from the drawbacks in the prior art and provide a full penetration weld in joints of adjacent workpieces having variable gaps of up to 2.5 millimeters.

One advantage of an embodiment of the present disclosure includes obtaining full penetration weld of adjacent components including variable gaps of up to about 2.5 millimeters. Another advantage of the present disclosure is that the adaptive hybrid welding system provides full penetration welds free from undercut or underfill. Yet another advantage is adaptive hybrid welding system provides real time adjustments to welding parameters to provide a full penetration weld.

Figure 1:
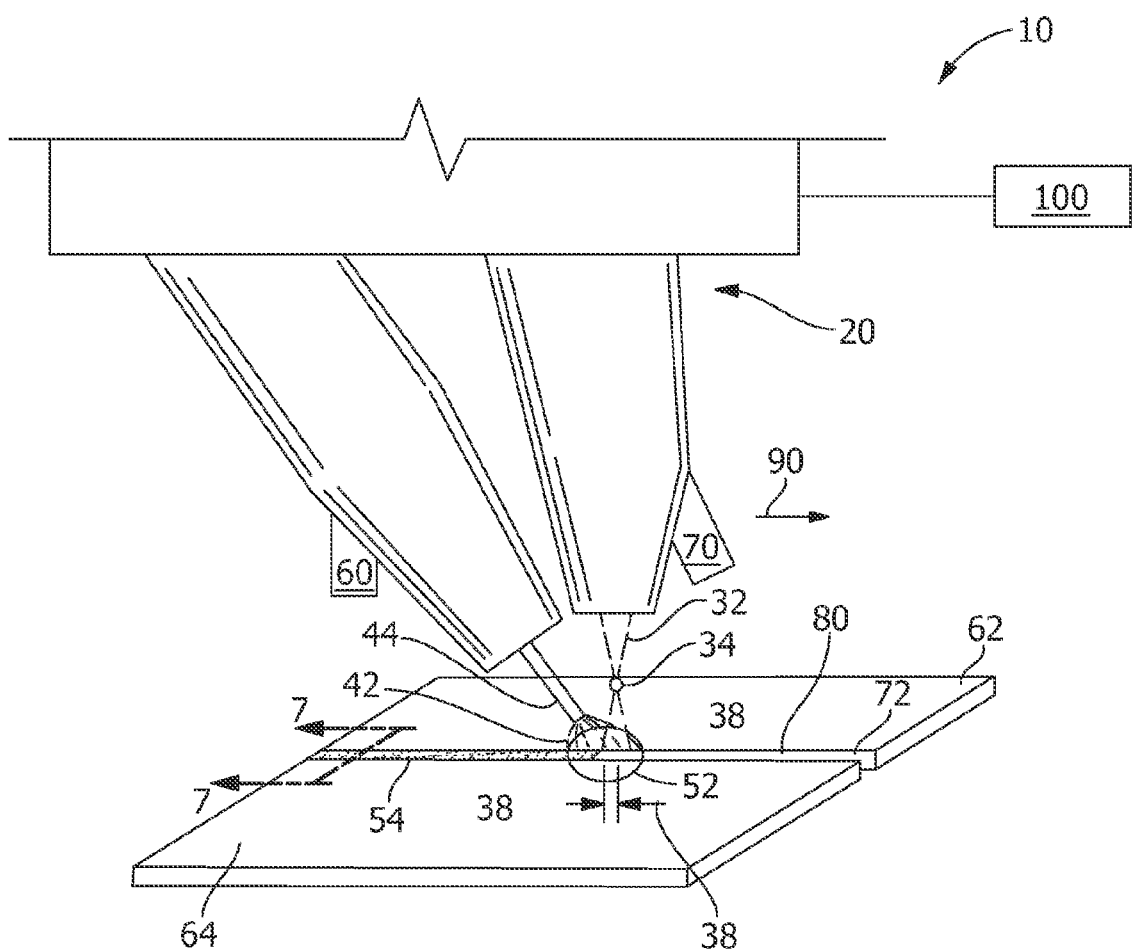
FIG. 1 is a perspective view of a schematic representation of the adaptive hybrid welding system and hybrid welding apparatus of the present disclosure.

FIG. 1 schematically illustrates an adaptive hybrid welding system 10 including a hybrid welding apparatus 20 of the present disclosure. Hybrid welding apparatus 20 includes a laser 30 and an electric arc welder 40. Laser 30 and electric arc welder 40 are arranged and disposed to direct energy toward at least two adjacent workpieces 62 and 64 and each have adjustable welding parameters. Adjustable welding parameters, include but are not limited to, welding speed of hybrid welding apparatus 20, laser frequency, laser focus (see FIG. 4), laser power, wire 44 feeding speed of electric arc welder 40, voltage and current of arc 42 of electric arc welder 40, electric arc welder pulse parameter setting, including frequency, peak current, background current, pulse time, and combinations thereof. Adaptive hybrid welding system 10 includes a control system 100 connected to hybrid welding apparatus 20. Control system 100 modifies the welding parameters of laser 30 and electric arc welder 30 and a spacing 38 between a laser beam 32 of laser 30 and arc 42 of electric arc welder 40. A seam tracker 70 is connected to control system 100. Seam tracker 70 is operable to measure a seam property of adjacent workpieces 62 and 64 prior to welding. Seam tracker 70 is operable to send signals to control system 100 in response to the measured seam property. Seam properties include, but are not limited to, joint alignment, spacing 38 between adjacent workpieces 62 and 64, mismatch between adjacent workpieces 62 and 64, and gap geometry, including gap width 58 (see FIG. 3) between adjacent workpieces 62 and 64. Control system 100 modifies welding parameters based on the signal from seam tracker 70. Adaptive control hybrid welding system 10 joins adjacent workpieces 62 and 64 having plurality of variable gaps 50 along seam 72. Adaptive control hybrid welding system 10 includes a weld monitoring device 60 connected to control system 100. Weld monitoring device 60 is operable to measure a weld property of a weld seam 56 in real time to determine if full penetration weld 54 is obtained. Weld properties, include but are not limited to, weld joining, weld mismatch, weld underfill, weld overfill, weld bead, including top of weld bead 74 (see FIG. 7), weld penetration and combinations thereof.

In one embodiment, laser 30 is selected from a Nd:YAG laser, a CO$_2$ laser, a fiber laser, and a disk laser. Electric arc welder 40 is selected from welders having non-consumable electrodes with wire feeding, such as, but not limited to, a gas tungsten arc welder (GTAW) with wire feeding and a plasma arc welder (PAW) with wire feeding. In one embodiment, electric arc welder 40 is selected from welders having consumable electrodes, such as, but not limited to, a gas metal arc welder (GMAW) and a flux-cored arc welder (FCAW).

Workpieces 62 and 64 include any materials that are joinable or weldable, but generally include materials, such as, but not limited to, aluminum, titanium, steel, stainless steel, brass, copper, nickel, beryllium-copper, superalloy, alloys thereof and combinations thereof. Adaptive control hybrid welding system 10 is especially suitable for use with steel alloys, such as, but not limited to mild-steel, low alloy steel, structural steel, stainless steel, superalloys, and combinations thereof.

Figure 2:
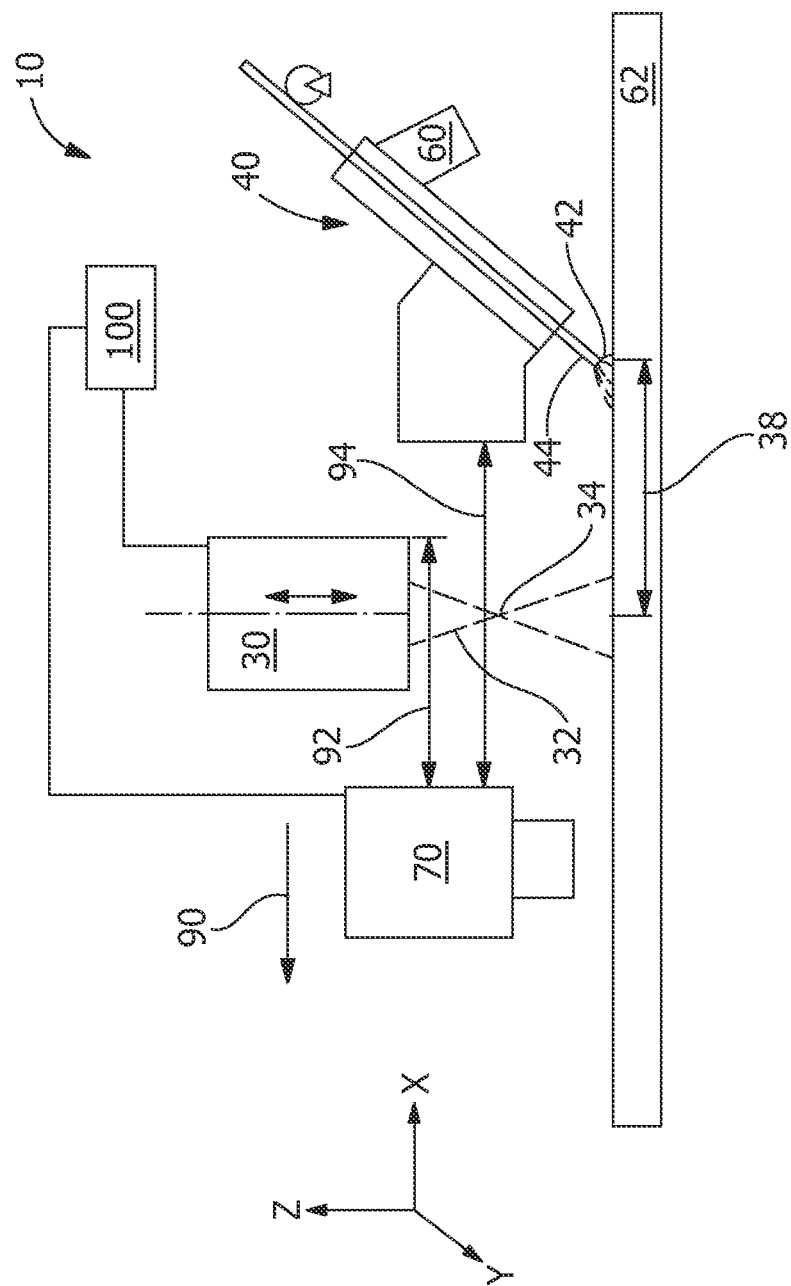
FIG. 2 is a schematic side view of FIG. 1 of the adaptive hybrid welding system and hybrid welding apparatus of the present disclosure.

FIG. 2 is a side schematic view of adaptive control hybrid welding system 10. As shown by weld direction 90, in the X direction, laser 30 leads electric arc welder 40. Seam tracker 70, laser 30 and electric arc welder 40 are movable in the Y and Z directions relative to workpiece 62. Laser 30 is moveable relative to electric arc welder 40 in the X direction to increase or decrease spacing 38 between laser beam 32 and weld arc 42. Distances 92 and 94 between seam tracker 70 and laser 30 and electric arc welder 40, respectively can be varied in the X direction.

Figure 3:
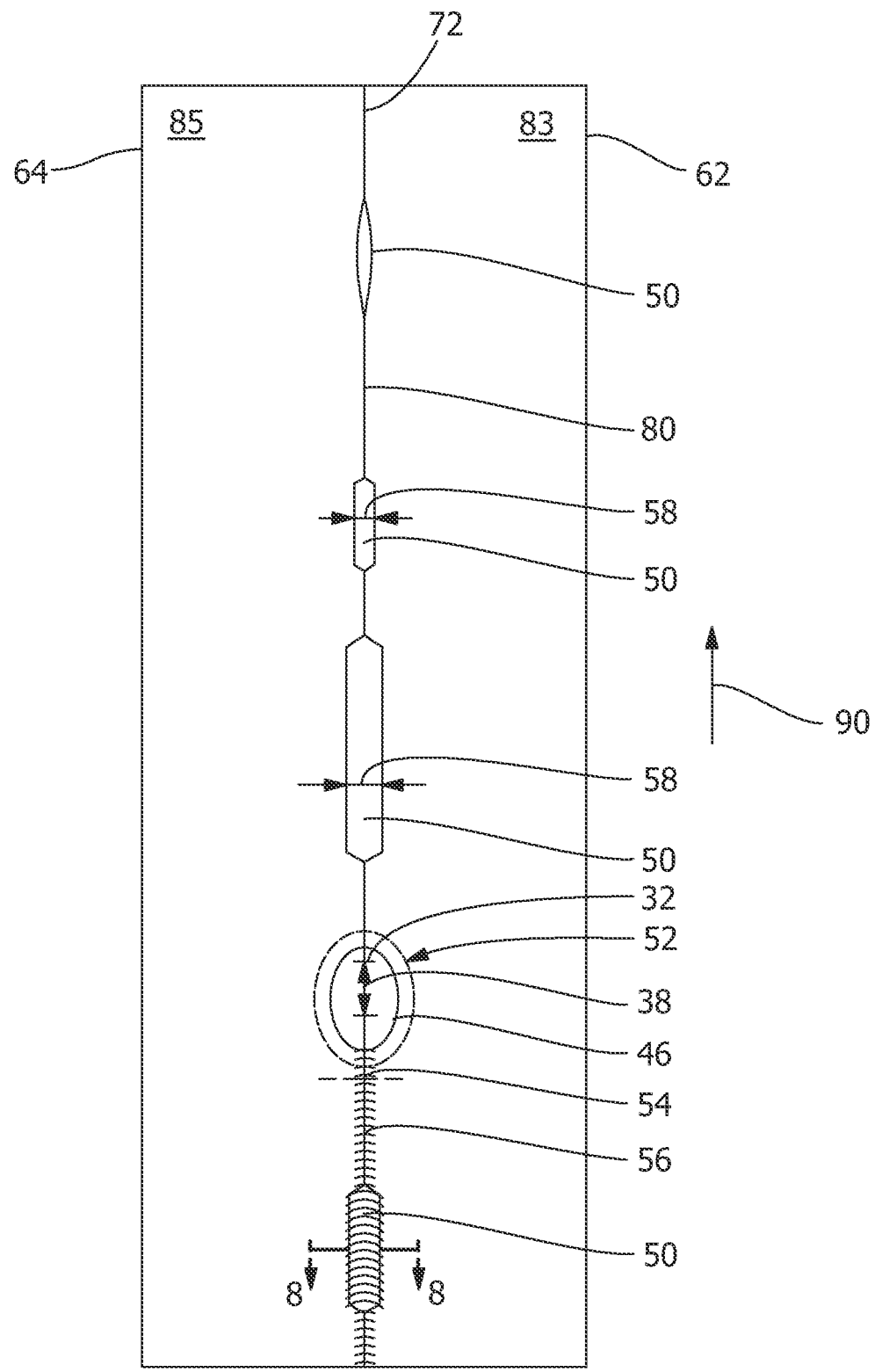
FIG. 3 is a schematic top view of FIG. 1 with the components of the hybrid welding apparatus removed of the present disclosure.

FIG. 3 is a top view of the present disclosure with most of the components of adaptive control hybrid welding system 10 removed. Seam 72 includes variable gaps 50 along joint 80 between adjacent workpieces 62 and 64. Variable gaps 50 include widths 58 from about 0.3 millimeters to about 2.5 millimeters. When seam tracker 70 encounters variable gap 50 in seam 72, seam tracker 70 sends signal to control system 100 to modify weld parameters in response to gap width 58. As shown in FIG. 3, combined energy from beam 32 of laser 30 and electric arc welder 40 are directed toward adjacent workpieces 62 and 64 to create common molten pool 52. Size of common molten pool 52 can be varied by changing welding parameters and spacing 38 between laser beam 32 and arc 42. Common molten pool 52 operates to provide a full penetration weld 92 to join adjacent workpieces 62 and 64 having variable gaps 50. As used "common molten pool" 52 refers to the molten material created by the weld arc 42 of electric arc welder 40 (see FIG. 1) that includes a portion of each of edge of workpieces 62 and 64 and consumable wire 44. The molten material is further energized by beam 32 of laser 30 thereby causing the molten material to penetrate deeper into workpieces 62 and 64 to obtain a full penetration weld 54. Arc area 46 is the zone around weld arc from electric welder 40 that provides additional energy or heat to surface 83 and 85 of workpieces 62 and 64. Generally, any materials within arc area 46 are energized or melted. Arc area 46 aids in melting first wire 44 and adds additional energy to laser beam 32 to form common molten pool 52. Any suitable materials can be used for consumable wire 44, depending on desired weld characteristics such as weld strength, weld chemistry, and weld hardness. Suitable examples of materials for consumable wire 44 include, but are not limited to, aluminum, iron, cobalt, copper, nickel, stainless steel, carbon steel, titanium, gold, silver, palladium, platinum, alloys thereof, and combinations thereof.

Figure 4:
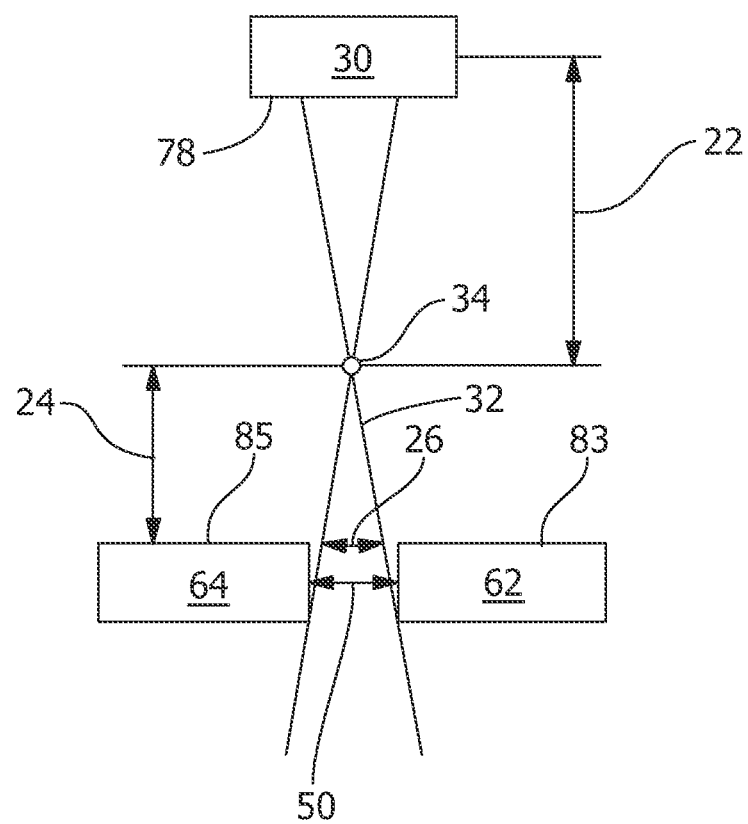
FIG. 4 is a schematic of the laser of the adaptive hybrid welding system of the present disclosure.

FIG. 4 is a side view of laser 30 of adaptive control hybrid welding system 10. As shown in FIG. 4, the distance "A" 22 is the distance from laser head 78 to the laser beam focus point 34. Distance "A" 22 is typically defined by the manufacture of laser head 78. Distance "A" 22 between laser head 78 and the laser beam focus point 34 remains fixed. Distance "B" 24 is the distance from the laser beam focus 34 to the top surface 83 and 85 of workpieces 62 and 64. In an alternative embodiment, distance "B" 24 between laser beam focus point 34 and surface 83 and 85 of workpieces 62 and 64 is varied based on width 58 of gap 50. Varying distance "B" 24 causes laser beam 32 to focus or defocus. In one embodiment, when width 58 of gap 50 is greater than 0.3 millimeters, the distance "B" 24 between laser beam focus point 34 and surface 83 and 85 of workpieces 62 and 64 is increased. The increase in distance "B" 24 causes focus point 34 of laser beam 32 to move away from surface 83 and 85 resulting in a more defocused laser beam 32. Increasing defocus of laser beam 32 results in a wider beam range 26, shown as "C," which provides energy wide enough to cover surface 83 and 85 for welding adjacent workpieces 62 and 64. When seam tracker 70 measures widths 58, generally greater than 0.3 millimeters less than the previously measured gap width 58, a signal from seam tracker is sent to control system 100. Control system 100 then decreases the distance "B" 24, by moving laser head 78 closer to workpieces 62 and 64.

As shown in FIG. 4, defocus distance "B" 24 is the distance from laser focus point 34 to surface 83 and 85 of workpieces 62 and 64. Defocus distance "B" 24 is varied depending on width 58 of gap 50 along joint 80 (see FIG. 2) to be welded. For larger gaps, a larger defocus distance "B" 24 is used and for smaller gaps, a smaller defocus distance "B" 24 is used. In one embodiment, the defocus distance "B" 24 is approximately 5 millimeters to approximately 25 millimeters, or alternatively approximately 8 millimeters to approximately 23 millimeters, or alternatively approximately 10 millimeters to approximately 20 millimeters. In one embodiment, beam range 26, shown as distance "C," is varied between approximately 0 millimeters (focused laser, laser focus on the top) to approximately 5 millimeters or alternatively between approximately 0.5 millimeters to approximately 4 millimeters or alternatively between approximately 1 millimeter to approximately 4 millimeters.

Figure 5:
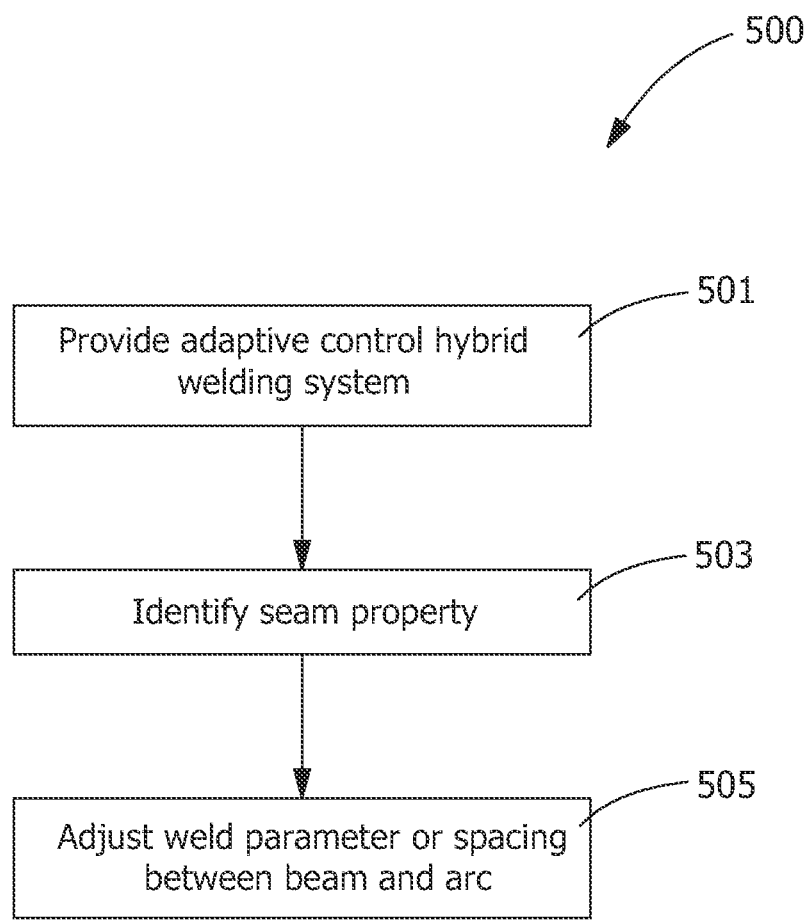
FIG. 5 is a flow chart of the method of controlling the adaptive hybrid welding system of the present disclosure.

As shown in the flowchart of FIG. 5, method 500 of welding adjacent workpieces 62 and 64 using adaptive control hybrid welding system 10 is provided. Method 500 includes providing adaptive control hybrid welding system 10, step 501. Adaptive control hybrid welding system 10 includes hybrid welding apparatus 20 having laser 30 and electric arc welder 40 (see FIG. 1). Laser 30 and electric arc welder 40 each have adjustable welding parameters, including but not limited to, welding speed of hybrid welding apparatus 20, laser frequency, laser focus (see FIG. 4), laser power, wire feeding speed of electric arc welder 40, voltage and current of the arc of electric arc welder 40, electric arc welder pulse parameter setting, including frequency, peak current, background current, pulse time, and combinations thereof. Adaptive control hybrid welding system 10 includes control system 100 connected to hybrid welding apparatus 20 (see FIG. 2). Control system 100 modifies the welding parameters of laser 30 and electric arc welder 40 and spacing 38 between laser beam 32 of laser 30 and arc 42 of electric arc welder 40 (see FIG. 1). Seam tracker 70 is connected to control system 100 and is operable to measure a seam property of adjacent workpieces 62 and 64 along seam 72 prior to welding. Seam tracker 70 is operable to send signals to control system 100 in response to the measured seam property. Control system 100 is operable to modify welding parameters based on the signal from seam tracker 70. Adaptive control hybrid welding system 10 joins adjacent workpieces 62 and 64 having a plurality of gaps 50 having variable widths 58 along seam 72 (see FIG. 3). Variable widths 58 of gaps 50 in seam 82 being up to approximately 2.5 millimeters wide. Method 500 includes identifying seam properties, such as, but not limited to, variable gaps 50 in seam 72 between adjacent workpieces 62 and 64 with seam tracker 70, step 503 (see FIGS. 1 and 3). Method 500 includes adjusting at least one weld parameter of laser 30, electric arc welder 40 with control system, and adjusting spacing 38 between laser beam 32 and arc 42 with control system 100 in response to the identified seam property, where the seam property is variable gaps 50 are greater than approximately 0.3 millimeters wide between adjacent workpieces 62 and 63 (see FIG. 3), step 505. The step of adjusting, step 505 provides full penetration weld 54 along weld seam 56 (see FIG. 3).

In the step of adjusting welding parameter, step 505, adjusting focus point 34, adjusts focus of laser 30. In one embodiment, step of adjusting weld parameter, step 505, includes moving laser head 78 away from or toward surface 83 and 85 of adjacent workpieces 62 and 64 (see FIG. 4). In another embodiment, step of adjusting weld parameter, step 505, includes adjusting the laser beam focus optically or electrically without physically moving the laser head 78 up and down. Step of adjusting welding parameter, step 505 may also include using a servo motor in laser head 78 to adjust a lens to focus or defocus laser 30. Adjusting welding parameter, step 505, may also include moving laser 30 away from surface 83 and 85 of adjacent workpieces 62 and 64 in response to gap 50 in seam 70 being greater than approximately 0.3 millimeters than previous measurement of seam 70 (see FIGS. 3 and 4). In adjusting spacing 38, step 505, spacing 38 between laser beam 32 and arc 42 is increased when laser 32 is moved away from surface 83 and 85 of adjacent workpieces 62 and 64 (see FIG. 4) to account for larger gap between workpieces 62 and 64. In step of adjusting spacing 38, step 505, spacing 38 between laser beam 32 and arc 42 is decreased when laser focus point 34 of laser 30 is moved closer to surface 83 and 85 of adjacent workpieces 62 and 64. In the step of adjusting, step 505, welding speed of adaptive control welding system 10 is decreased when laser focus point 34 of laser 30 is moved away from surface 83 and 85 of adjacent workpieces 62 and 64.

Figure 6:
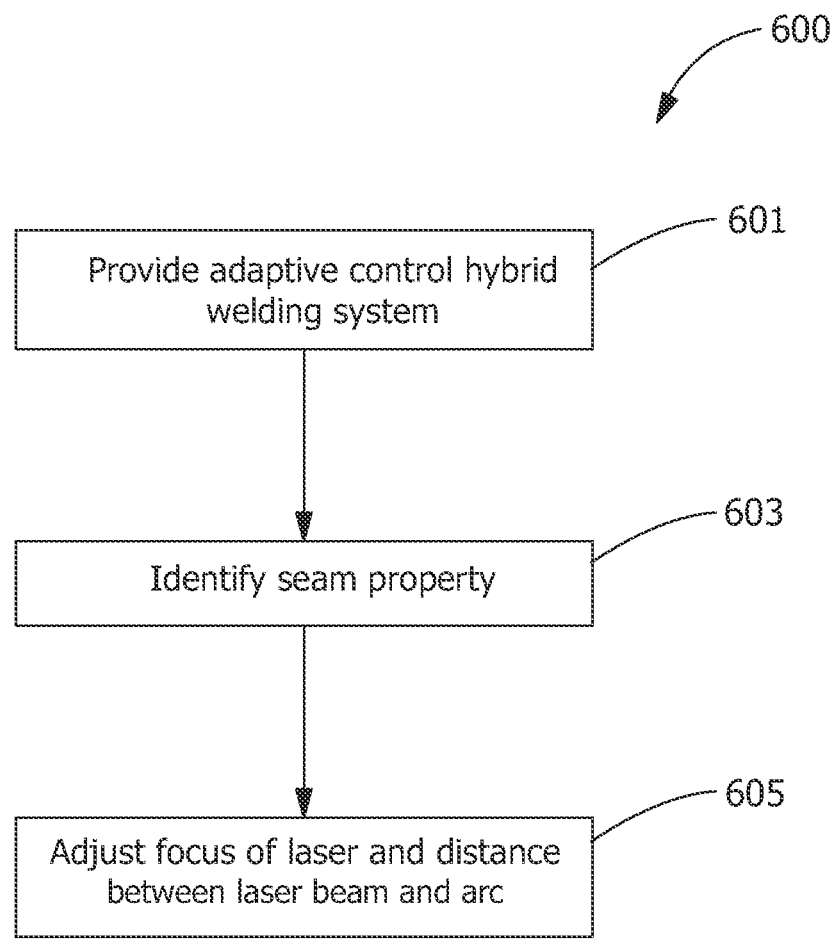
FIG. 6 is a flow chart of the method of controlling the adaptive hybrid welding system of the present disclosure.

As shown in the flowchart of FIG. 6, method 600 of controlling adaptive control hybrid welding system 10 is provided. Method 600 includes providing adaptive control hybrid welding system 10, step 601 (see FIG. 1). Adaptive control hybrid welding system 10 includes hybrid welding apparatus 20 having laser 30 and electric arc welder 40, each having adjustable welding parameters (see FIG. 1). Adaptive control hybrid welding system 10 includes control system 100 connected to hybrid welding apparatus 20, wherein control system 100 modifies the welding parameters of laser 30, electric arc welder 40, and the spacing between them in real time (see FIG. 2). Adaptive control hybrid welding system 100 includes seam tracker 70 connected to control system 100 (see FIG. 2). Seam tracker 70 is operable to measure a seam property of adjacent workpieces 62 and 64 along seam 72 prior to and during welding (see FIGS. 1 and 2). Seam tracker 70 is operable to send signals to control system 100 in response to the measured seam property (see FIG. 2). Control system 100 modifies welding parameters based on the signal from seam tracker 70. Adaptive control hybrid welding system 10 joins adjacent workpieces 62 and 64 having plurality of variable gaps 50 having different widths 58 along seam 70 (see FIG. 3 and FIG. 7). Variable gaps 50 having different widths 58 in seam 72 are up to approximately 2.5 millimeters wide (see FIG. 3). Method 600 includes identifying seam property in seam 72 between adjacent workpieces 62 and 64 with seam tracker 70, step 603 (see FIG. 3). Method 600 includes adjusting a focus of laser 30 and spacing 38 between laser beam 32 and arc 42 by control system 100 in response to the measured seam property, step 605. If seam property is variable gap 50 that has a width difference of greater than approximately 0.3 millimeters wide relative to the previous measured gap 50 between adjacent workpieces 62 and 64, seam tracker 70 sends signal to control system 100 once variable gap 50 is identified (see FIG. 3). Adjusting, step 605, provides full penetration weld 54 along seam 72 (sees FIGS. 7 and 8). Adjusting, step 605, includes directing a laser head toward to or away from the adjacent workpieces (see FIG. 3). In the step of adjusting, step 605, spacing 38 between laser beam 32 and arc 42 is increased when laser head 78 is directed away from adjacent workpieces 62 and 64 (see FIG. 4). In the step of adjusting, step 605, welding speed of the hybrid welding apparatus 10 is decreased when variable gaps 50 greater than approximately 0.3 millimeters are measured between adjacent workpieces 62 and 64.

In operation, seam tracker 70 is used to measure properties of seam 72 (see FIG. 3). When seam tracker 70 identifies variable gap 50, having a width greater than 0.3 millimeters greater or less than the previously measured seam 72 a signal is sent to control system 100. Control system 100 determines whether the gap is greater than or smaller than the previously measured seam 72. Upon determining that variable gap 50 is greater than previously measured seam 72 (see FIG. 3), control system 100 modifies one or more of the following in adaptive control hybrid welding system 10: welding speed of hybrid welding apparatus 20 is slowed; laser focal point 34 (see FIG. 4) is moved away from surface 83 and 85 of workpieces 62 and 64 to defocus laser beam 32; laser power is reduced to prevent blowholes; spacing 38 between laser beam 32 and arc 42 is increased to avoid metal spray that would result from the interference of defocused laser beam 32 and arc 42 of electric welder 40; consumable wire 44 feeding speed is increased. Upon determining that variable gap 50 is greater than previously measured seam 72, control system 100 modifies one or more of the following in adaptive control hybrid welding system 10: welding speed of hybrid welding apparatus 20 is increased; laser focal point 34 is moved close to surface 83 and 85 of workpieces 62 and 64 to focus laser beam 32 (see FIG. 4); laser power is increased; spacing 38 between laser beam 32 and arc 42 is decreased because there is less chance of interference of laser beam 32 and arc 42 of electric welder 40; and/or wire 44 feeding speed is decreased.

For variable gap 50 that is identified to be 1.5 millimeters greater than the previously measured seam width, the approach is to reduce welding speed of hybrid welding apparatus 20, change the laser defocus distance "B" from +8 mm to +15 millimeters and to increase spacing 38 between laser beam 32 and arc 42.

EXAMPLES

Figure 7:
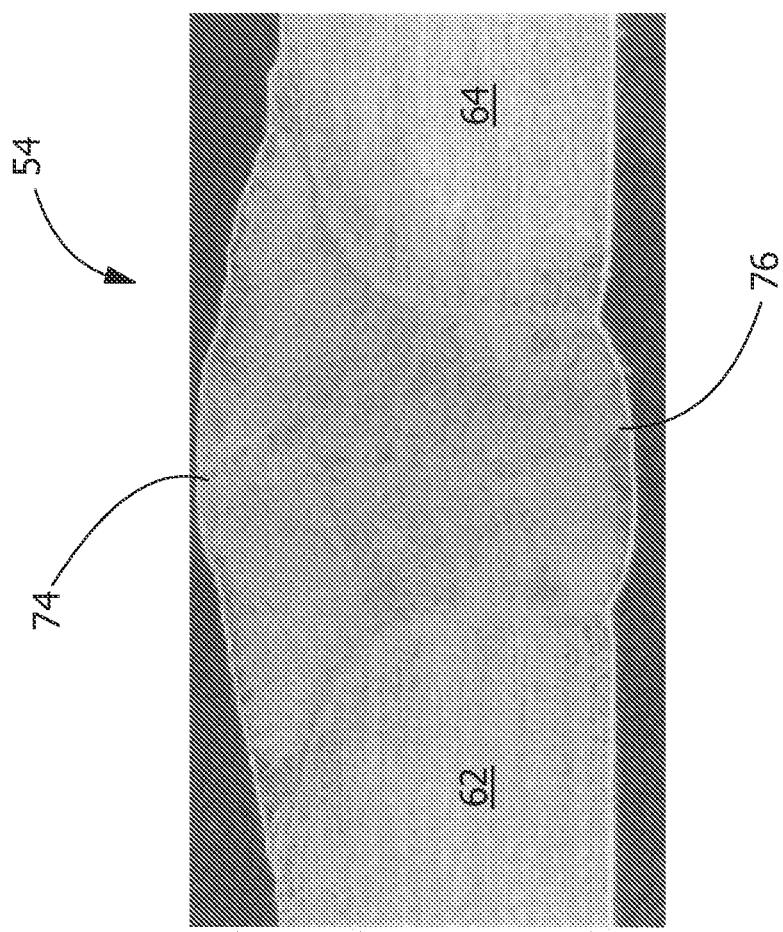
FIG. 7 is a cross-sectional view take in direction 7-7 of FIG. 1 of a full penetration weld created by the adaptive hybrid welding control system of the present disclosure.

As shown in FIG. 7 two adjacent workpieces 62 and 64 were joined with a full penetration weld 54 having a top bead 74 and bottom bead 76 using adaptive control hybrid welding system 10. Adaptive control hybrid welding system 10 includes hybrid welding apparatus 20, seam tracker 70 and control system 100 connected to hybrid welding apparatus and seam tracker 70. Hybrid welding apparatus 20 includes laser 30 having beam 32 and an electric arc welder having an arc 42. In this example, electric arc welder 40 is a GMAW torch having a consumable wire 44. The welded workpieces 62 and 64 (see FIG. 1) were ⅛" thick stainless steel (SS304, available from Greer, S.C.) with a shear edge. The welding speed of the hybrid welding apparatus 20 was set to 80 inches per minute (ipm). Laser 30 power was set at 4 kW and electric arc welder 40 setting was 400 ipm with an ER308L welding filler wire and the welding filling wire having a 0.9 millimeter (0.035 inch) diameter. Adjacent workpieces 62 and 64 were aligned and abutting with zero gap. Laser 30 was positioned to align the laser beam focus 34 (shown in FIG. 4) on the surface 83 and 85 of workpieces 62 and 64 to obtain a beam range 26 (shown as "C" in FIG. 4) of less than 1 millimeter. Spacing 38 between laser beam 32 and arc 42 was 5 millimeters. The full penetration weld 54 from this example is shown in FIG. 7.

Figure 8:
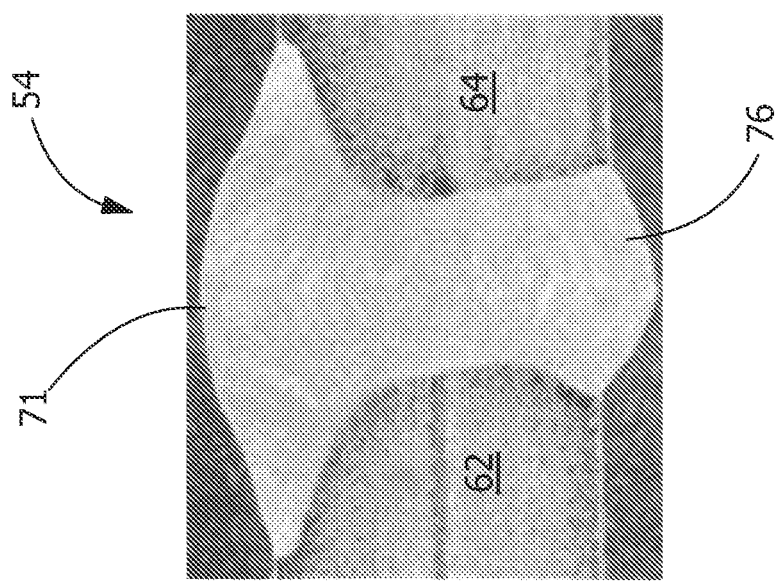
FIG. 8 is a cross-sectional view take in direction 8-8 of FIG. 3 of a full penetration weld created by the adaptive hybrid welding control system of the present disclosure.

As shown in FIG. 8 two adjacent workpieces 62 and 64 were joined with a full penetration weld 54 having a top bead 74 and bottom bead 76 using adaptive control hybrid welding system 10. Adaptive control hybrid welding system 10 includes hybrid welding apparatus 20, seam tracker 70 and control system 100 connected to hybrid welding apparatus and seam tracker 70. Hybrid welding apparatus 20 includes laser 30 having beam 32 and an electric arc welder having an arc 42. In this example, electric arc welder 40 is a GMAW torch having a consumable wire 44. The welded workpieces 62 and 64 (see FIG. 1) were ⅛" thick stainless steel (SS304, available from Greer, S.C. with a shear edge. The welding speed of the hybrid welding apparatus 20 was set to 40 inches per minute (ipm). Laser 30 power was set at 3 kW and electric arc welder 40 setting was 400 ipm with an ER308L welding filler wire and the welding filler wire having a 0.9 millimeter (0.035 inch) diameter. Adjacent workpieces 62 and 64 were aligned and included a variable gap 50 of 2.5 millimeters. Laser 30 was positioned at a distance from surface 83 and 85 of workpieces 62 and 64 to obtain a beam range 26 (shown as "C" in FIG. 4) of 6 millimeters with the laser focus point 34 having a distance of 15 mm from the surfaces 83 and 85 of workpieces 62 and 64. Spacing 38 between laser beam 32 and arc 42 was 10 millimeters. The full penetration weld 54 from this example is shown in FIG. 8.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An adaptive control hybrid welding system comprising:
    a hybrid welding apparatus, the hybrid welding apparatus having a laser and an electric arc welder, the laser and the electric arc welder each having adjustable welding parameters and being arranged to alter the spacing between a laser beam of the laser and an arc of the electric arc welder;
    a control system connected to the hybrid welding apparatus, wherein the control system modifies the adjustable welding parameters of the laser and the electric arc welder and the spacing between the laser beam of the laser and the arc of the electric arc welder; and
    a seam tracker connected to the control system, the seam tracker operable to measure a seam property of adjacent workpieces prior to welding, the seam tracker operable to send signals to the control system in response to the measured seam property, wherein the control system modifies the adjustable welding parameters based on the signal from the seam tracker,
    wherein the adaptive control hybrid welding system joins adjacent workpieces having variable gaps along the seam.

2. The adaptive control hybrid welding system of claim 1, wherein the adjustable welding parameters are selected from the group consisting of welding speed of the hybrid welding apparatus, laser frequency, laser focus, laser power, wire feeding speed of the electric arc welder, voltage and current of the arc of the electric arc welder, electric arc welder pulse parameter setting, including frequency, peak current, background current, pulse time, and combinations thereof.

3. The adaptive control hybrid welding system of claim 1, wherein the variable gaps in the seam are up to about 2.5 millimeters wide.

4. The adaptive control hybrid welding system of claim 1, wherein the laser is selected from the group consisting of a Nd:YAG laser, a $CO_2$ laser, a fiber laser, and a disk laser.

5. The adaptive control hybrid welding system of claim 1, wherein electric arc welder is selected from the group consisting of non-consumable electrode welders with wire feeding, and consumable electrode welders.

6. The adaptive control hybrid welding system of claim 1, wherein a weld monitoring device is connected to the control system, the weld monitoring device being operable to measure a weld property of a weld seam in real time.

7. A method of controlling an adaptive control hybrid welding system comprising:
providing the adaptive control hybrid welding system, the adaptive control hybrid welding system including:
a hybrid welding apparatus, the hybrid welding apparatus having a laser and an electric arc welder, the laser and the electric arc welder each having adjustable welding parameters and being arranged to alter the spacing between a laser beam of the laser and an arc of the electric arc welder;
a control system connected to the hybrid welding apparatus, wherein the control system modifies the adjustable welding parameters of the laser, the electric arc welder and the spacing between the laser beam of the laser and the arc of the electric arc welder; and
a seam tracker connected to the control system, the seam tracker operable to measure a seam property of adjacent workpieces along a seam prior to welding, the seam tracker operable to send signals to the control system in response to the measured seam property, wherein the control system modifies the adjustable welding parameters based on the signal from the seam tracker,
wherein the adaptive control hybrid welding system joins adjacent workpieces having variable gaps along the seam, the variable gaps in the seam being up to approximately 2.5 millimeters wide;
identifying the seam property between adjacent workpieces with the seam tracker; and
adjusting at least one adjustable welding parameter of the laser or the electric arc welder or the spacing between the laser beam and the arc with the control system in response to the identified seam property, wherein the seam property is the variable gap being greater than approximately 0.3 millimeters wide between the adjacent workpieces, wherein adjusting provides a full penetration weld along the seam.

8. The method of claim 7, wherein the adjustable welding parameters are selected from the group consisting of welding speed of the hybrid welding apparatus, laser frequency, laser focus, laser power, wire feeding speed of the electric arc welder, voltage and current of the arc of the electric arc welder, electric arc welder pulse parameter setting, including frequency, peak current, background current, pulse time, and combinations thereof.

9. The method of claim 7, wherein the step of adjusting at least one adjustable welding parameter is adjusting a focus of the laser.

10. The method of claim 9, wherein the adjusting the focus of the laser includes moving a laser head away from or toward the adjacent workpieces or using a servo motor in the laser head to adjust a lens to focus or defocus the laser.

11. The method of claim 7, wherein the step of adjusting at least one adjustable weld parameter is adjusting a distance between the laser and the electric arc welder.

12. The method of claim 7, wherein the step of adjusting at least one adjustable welding parameter is adjusting a focus of the laser and adjusting a distance between the laser and the electric arc welder.

13. The method of claim 12, wherein the laser is moved away from the adjacent workpiece in response to the gap in the seam being greater than approximately 0.3 millimeters.

14. The method of claim 12, wherein the distance between the laser and the electric arc welder is increased when the laser is moved away from the adjacent workpieces.

15. The method of claim 12, wherein the distance between the laser and the electric arc welder is decreased when the laser is moved closer to the adjacent workpieces.

16. The method of claim 12, wherein a speed of the welding system is decreased when the laser is moved away from the adjacent workpieces.

* * * * *